US009217796B2

(12) United States Patent
Eick et al.

(10) Patent No.: US 9,217,796 B2
(45) Date of Patent: Dec. 22, 2015

(54) SIMULTANEOUS COMPOSITE LAND SEISMIC SWEEP

(71) Applicant: CONOCOPHILLIPS COMPANY, Houston, TX (US)

(72) Inventors: Peter M. Eick, Houston, TX (US); Joel D. Brewer, Houston, TX (US); Shan Shan, Houston, TX (US)

(73) Assignee: ConocoPhillips Company, Houston, TX (US)

( * ) Notice: Subject to any disclaimer, the term of this patent is extended or adjusted under 35 U.S.C. 154(b) by 413 days.

(21) Appl. No.: 13/874,187

(22) Filed: Apr. 30, 2013

(65) Prior Publication Data

US 2013/0286790 A1    Oct. 31, 2013

Related U.S. Application Data

(60) Provisional application No. 61/640,455, filed on Apr. 30, 2012.

(51) Int. Cl.

| G01V 1/155 | (2006.01) |
|---|---|
| G01V 1/09 | (2006.01) |
| G01V 1/02 | (2006.01) |
| G01V 1/00 | (2006.01) |
| G01V 1/145 | (2006.01) |

(52) U.S. Cl.
CPC ...... *G01V 1/02* (2013.01); *G01V 1/005* (2013.01); *G01V 1/145* (2013.01)

(58) Field of Classification Search
CPC ....... G01V 1/09; G01V 1/143; G01V 1/1047; G01V 1/147; G01V 1/145; G01V 1/155
USPC .......................................... 181/111, 114, 121
See application file for complete search history.

(56) References Cited

U.S. PATENT DOCUMENTS

| 2,675,882 | A | * | 4/1954 | Bazzoni et al. ............... 181/111 |
|---|---|---|---|---|
| 3,777,843 | A | * | 12/1973 | Fair et al. ....................... 181/114 |
| 4,114,722 | A | * | 9/1978 | Weber et al. ................... 181/114 |
| 4,133,409 | A | * | 1/1979 | Mifsud et al. ................. 181/114 |
| 4,372,420 | A | * | 2/1983 | White ............................ 181/120 |
| 4,458,777 | A | * | 7/1984 | Weber et al. ................... 181/121 |
| 4,651,044 | A | * | 3/1987 | Kompanek ............... 310/323.17 |
| 4,853,906 | A | * | 8/1989 | Cole .............................. 367/189 |
| 5,614,670 | A | * | 3/1997 | Nazarian et al. ................ 73/146 |
| 7,330,401 | B2 | | 2/2008 | Jeffryes et al. |
| 7,657,350 | B2 | * | 2/2010 | Moran ........................... 701/22 |
| 7,668,262 | B2 | | 2/2010 | Woo et al. |

(Continued)

*Primary Examiner* — Ari M Diacou
(74) *Attorney, Agent, or Firm* — ConocoPhillips Company

(57) ABSTRACT

The invention is an electric sweep type seismic vibrator source of the type used in seismic prospecting for hydrocarbons. The source uses an engine and generator combination to create electric power for all systems on the source such as driving a frame of linear electric motors that direct a rod or piston to contact the ground in a recurring fashion along with driving the source from location to location through a survey area. Preferably a foot is arranged on the bottom end of the rod or piston for contact with the ground and by engaging the grid of motors to push down against the ground to create impulses that deliver acoustic seismic energy into the earth for geophones to sense and record. However, the pulses of seismic energy are delivered in a distinctive fashion where different linear motors are deliberately and concurrently providing different signals that create a distinctive composite signature or signal that can be identified in the data record for source separation purpose.

7 Claims, 2 Drawing Sheets

(56) References Cited

U.S. PATENT DOCUMENTS

| | | | |
|---|---|---|---|
| 7,841,444 B2* | 11/2010 | Cannell et al. | 181/121 |
| 8,256,565 B2* | 9/2012 | Pabon et al. | 181/104 |
| 2003/0168277 A1* | 9/2003 | Hopperstad et al. | 181/111 |
| 2006/0250891 A1 | 11/2006 | Krohn | |
| 2010/0232260 A1* | 9/2010 | Zowarka et al. | 367/189 |
| 2011/0209940 A1* | 9/2011 | Daraio | 181/139 |
| 2012/0037444 A1* | 2/2012 | Eick et al. | 181/114 |
| 2013/0155817 A1* | 6/2013 | Kim | 367/189 |

\* cited by examiner

SIMULTANEOUS COMPOSITE LAND SEISMIC SWEEP

CROSS-REFERENCE TO RELATED APPLICATIONS

This application is a non-provisional application which claims benefit under 35 USC §119(e) to U.S. Provisional Application Ser. No. 61/640,455 filed Apr. 30, 2012, entitled "SIMULTANEOUS COMPOSITE LAND SEISMIC SWEEP," which is incorporated herein in its entirety.

STATEMENT REGARDING FEDERALLY SPONSORED RESEARCH

None.

FIELD OF THE INVENTION

This invention relates to vibratory seismic sources and particularly to seismic sources that are held to the ground to deliver vibratory impulses into the earth for seismic prospecting of hydrocarbons and other subsurface resources.

BACKGROUND OF THE INVENTION

In the process of acquiring seismic data, seismic energy is delivered into the earth. Over the years, the preferred attributes of the seismic energy delivered into the earth have been honed to include a broad spectrum of wavelengths and sufficient power across the spectrum to be recorded at the surface. In general, a suitable land source must be able to deliver seismic energy waves in a spectrum of wavelengths from about 8 Hz up to 60-80 Hz. The source must have sufficient power across the spectrum so that the seismic waves have measurable amplitude at the surface after transiting deep into the earth, reflecting from or refracting through layers in the earth and transiting back to the surface. A last major characteristic of a desirable seismic source is that the energy from the source is distinguishable in the data record from seismic energy from other sources whether from background sources or other seismic prospecting.

Explosive charges have long been used as seismic sources although the intense release of energy is typically not permitted except in remote locations. Explosive sources, however, provide a wide array of wavelengths with considerable power across the wavelengths.

Hydraulic reciprocating seismic vibrators or vibes have been in use for many years using a baseplate connected to hydraulic rams that cause a reaction mass to reciprocate up and down to shake the ground through the baseplate. The hydraulic rams are operated to move the reaction mass through a sweep of the desired frequencies. However, the hydraulic systems are limited in their ability to provide sufficient power at high frequencies due to limitations of hydraulic flow in and out of the hydraulic cylinders. At very high hydraulic velocities, the hydraulic fluid is subject to cavitation effects when reversing directions that limits the amplitude of the movement of the reaction mass and thus the energy input in to the earth. At low frequencies, it is difficult for the hydraulic vibe to have enough travel to generate a low frequency wave into the ground. For example, consider how one would generate a one Hz wave with a hydraulic vibe. A very long throw of the reaction mass is needed to generate that wavelet because the mass has to be moving down and up the full one second.

BRIEF SUMMARY OF THE DISCLOSURE

The invention more particularly relates to a process for delivering a distinctive seismic signal or signature from a seismic source sweep for a seismic prospecting operation wherein an electrically powered seismic source is provided that has a plurality of linear electric motors where a ground contact element of the linear electric motor is provided in contact with the ground. The ground contact elements of the linear electric motors are driven to deliver multiple frequencies simultaneously against the ground such that at least two of the plurality of linear electric motors are deliberately and concurrently delivering different seismic signals against the ground, thereby creating a composition of all of the various signals where the composition defines a distinctive composite signature of the seismic energy conveyed into the earth.

"Generally vertical" or "generally vertically" should be interpreted as meaning "with an axis of movement sufficiently nearly vertical with respect to the ground so as effectively to impart energy to the ground." Normally, the axis of movement would be less than 20 degrees to vertical, or in another embodiment less than 10 degrees to vertical.

BRIEF DESCRIPTION OF THE DRAWINGS

A more complete understanding of the present invention and benefits thereof may be acquired by referring to the follow description taken in conjunction with the accompanying drawings in which.

DETAILED DESCRIPTION

Turning now to the detailed description of the preferred arrangement or arrangements of the present invention, it should be understood that the inventive features and concepts may be manifested in other arrangements and that the scope of the invention is not limited to the embodiments described or illustrated. The scope of the invention is intended only to be limited by the scope of the claims that follow.

Figure 1:
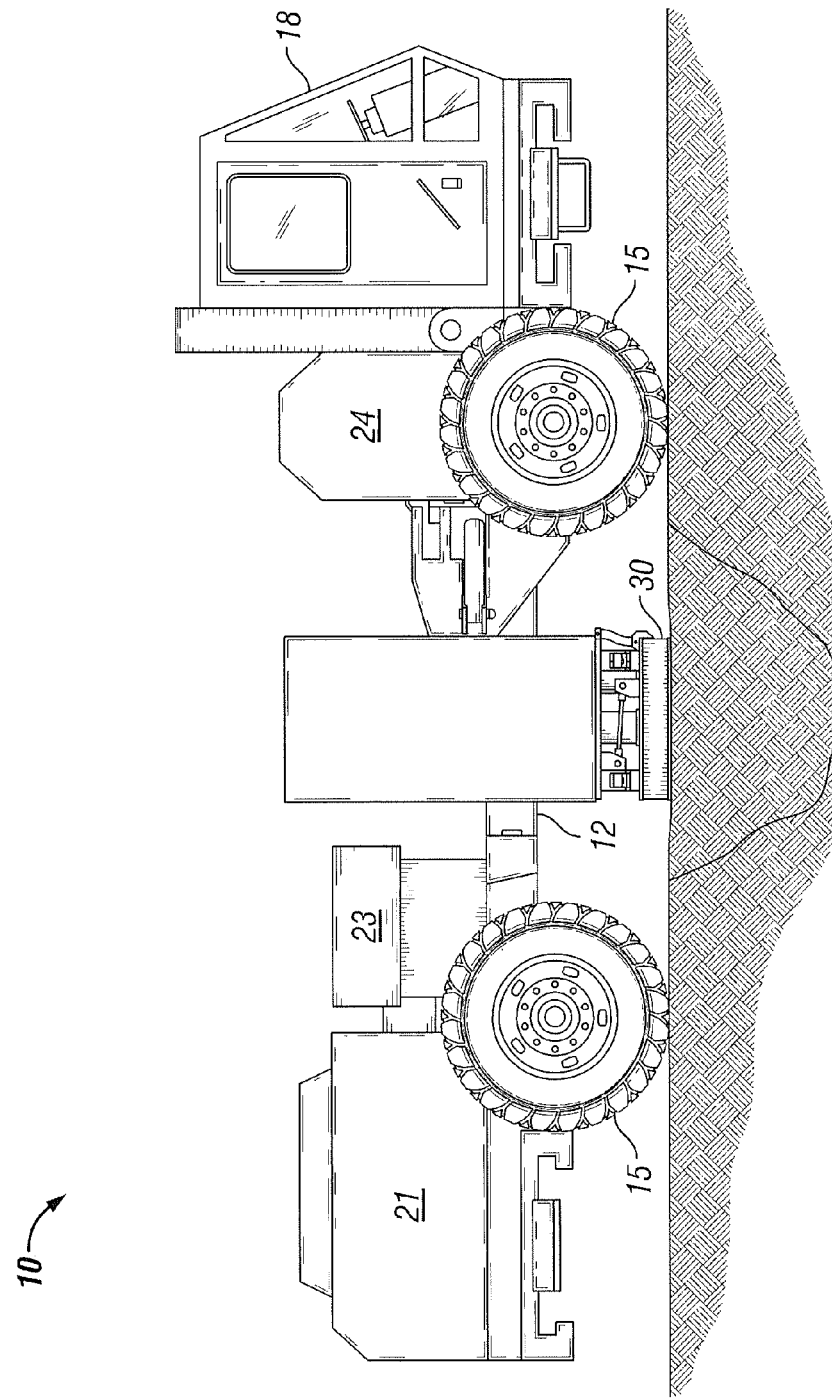
FIG. 1 is an elevation view of a discrete electric seismic source unit.

As shown in FIG. 1, an alternative vibrator actuator source 10 is shown comprising a chassis 12, four wheels 15 and a driver's cab 18. The alternative vibrator actuator source 10 uses a diesel engine 21 to turn an electric generator 23 and uses electric power to power the source 10 both for delivering acoustic energy into the ground and for moving along the ground from location to location. The source 10 utilizes electricity for all of its power needs. A large battery 24 is included to store energy for high situations of high electrical demand or when there are problems with the generator 23, but the battery 24 provides the power to return to a location for repair.

Figure 2:
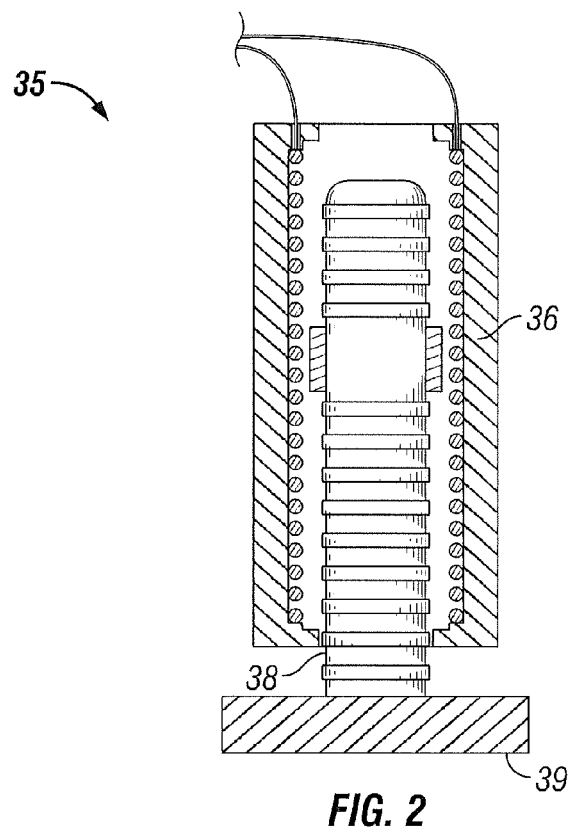
FIG. 2 is an enlarged fragmentary view of an electromechanical linear motor assembly for delivering seismic energy into the ground.
Figure 3:
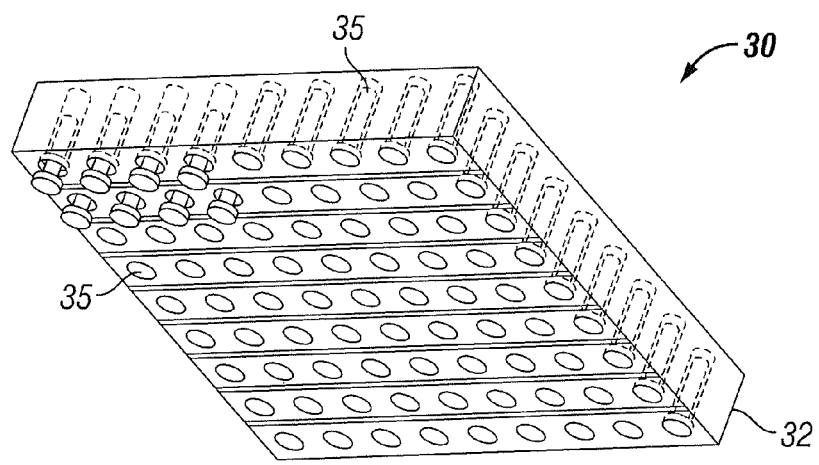
FIG. 3 is an enlarged perspective fragmentary view of a grid of electro mechanical linear motor assemblies for cooperatively delivering seismic energy into the ground.

Referring now to FIGS. 2 and 3, the acoustic energy delivery system 30 is carried under the chassis 12 and comprises a frame 32 that carries a number of linear motors 35. Each linear electric motor 35 includes a tubular body 36 and a rod or actuation bar 38 positioned within the tubular body 36 that extends telescopically from the lower end of the tubular body 36. A replaceable foot 39 is attached to the bottom end of the rod 38 for contacting the ground. The frame 32 includes mounts for a grid of linear motors 35. In the preferred embodiment approximately 112 linear motors 35 are arranged in a grid of perhaps 8 by 14.

In operation, the frame 32 is lowered into proximity to the ground G and the linear motors 35 are operated to lower the replaceable feet 39 into contact with the ground G. Once all of the replaceable feet 39 are in contact with the ground G, the linear motors 35 are activated to thrust the rods 38 toward the ground G and deflect the ground G and thereby deliver an impulse into the earth. The linear motors 35 are quickly operated to recoil the rods 38 without disengaging contact with the ground G by the replaceable feet 39. By successive thrusts and recoils, a pattern of acoustic energy is effectively delivered into the earth while the feet remain in contact with the ground G. It should be noted that the undulations and irregularities of the ground G may be accommodated avoiding decoupling across the dimension of the frame 32. This method may be arranged to automatically compensate for surface topographic variations along with soft and hard spots on the ground surface like rocks or logs. While it is recognized that ground typically does not deflect much, it does not take much deflection with a 60,000 pound vibrator holding the replaceable feet 39 to the ground G to deliver very useful acoustic energy. In this procedure, all of the linear motors 35 would be operated at the same time in the same direction using electrical power created by the electric generator 23 and supplemental battery 24 power if needed. The impulses would be repeated in a sequence where the impulse would occur with progressively increasing or decreasing rapidity such that a progression of frequencies of impulse forces would effectively deliver acoustic energy into the earth. The acoustic energy being characterizeable as a progressive pattern of frequencies covering a spectrum from about 1 Hz up to at least 80 Hz and preferably up to 120 Hz similar to a sweep.

The selection of the specific linear motors is an engineering issue at production time because they can be sourced to have a large thrust force but with short strokes as compared to those that have longer strokes with less thrust, but higher speeds. As one embodiment of the invention, the frame 32 has approximately 112 linear motors 35 that are arranged in a grid of perhaps 8 by 14. Each linear motor is capable of outputting a peak acceleration force of approximately 2400 Newtons (N) or approximately 540 pounds-force while using 34 amps RMS (Arms) at 240 volts AC. The 112 linear motors would then be capable of outputting 268,800 N or 60,480 pounds-force using approximately 914 kilowatts of power. An array of 112 of these motors could operate in the space provided and would require approximately a 1225 Hp diesel electric motor and generator providing the prime mover power source assuming reasonable losses in energy conversion.

One advantage of using a plurality of linear electric motors as proposed by the present invention is that other operational modes may become available and useful. According to the present invention, very creative sweeps may be delivered such all the linear motors are not directed to deliver to deliver the same seismic signal. Perhaps some are delivering high frequencies, some low frequencies and others are delivering intermediate frequencies simultaneously. Another pattern is for many linear motors 35 to deliver a series of pulses that have a set pattern including a range of frequencies set to follow a regular or irregular patter, but where not all of the linear motors 35 are delivering the same pattern concurrently. However, the composition of all the various signals with all of their potential flexibility creates a distinguishable pattern in the data record that may be easily attributable to the source that delivered that energy into the ground. Ideally, a unique and highly distinctive sweep may be delivered. The unique sweeps may be creatively designed such that multiple seismic vibes may deliver seismic energy at the same time where each vibe has its own distinctive sweep and the resulting seismic data may be inverted to identify which source at which location provided the source for each signal.

This new capability allows many vibes to be delivering seismic energy into the ground in nearby locations without interfering with one another or creating the need for time sharing. There are techniques for operating a gang or fleet of vibes concurrently, but they require starting the sweeps for all the vibes together so that they may be distinguished by phase offset. Phase offset works, but using a highly distinctive sweeps would likely provide higher clarity in distinguishing the energy of each vibe. By using the current invention it is possible to generate a composite signature from the multiple simultaneous sweeps where distinct interference patterns occur between linear motors 35 in the same acoustic energy delivery system 30. In the simplest form it is equivalent to the addition of sine waves of different frequencies. Another point of view, there are potential embodiments where a heterodyning effect may be created to provide a highly refined signal into the earth.

Ultimately, the potential permutations of the composite sweeps can make for a great many composite signatures that all have very distinctive attributes that are easily identifiable in the data record. For example, the series of impulses provide seismic energy across a frequency spectrum wherein the series of impulses are distinctive or distinguishable from other sweeps of seismic energy due to an irregular, but distinctive order of progression through the frequency spectrum with amplitude variations from the composite nature of the multiple sweeps. The other seismic energy may be from other vibes within a survey or in a completely separate survey on nearby land.

In an alternative embodiment of the invention, the alternative vibrator actuator source 10 using the electric linear motors 35 attached to the replaceable feet 39 that are in contact with the ground G, the linear motors 35 are activated to thrust the rods 38 toward the ground G and deflect the ground G and thereby deliver an impulse or acoustic signal into the earth. The plurality of linear electric motors 35 are activated in a manner such that a portion of the motors 35 are operated at one frequency of thrust while one or more other portions operate at other frequencies of thrust so that multiple frequencies are delivered simultaneously creating a desired composite signature or signal to the ground G and into the earth.

In another embodiment of the invention the alternative vibrator actuator source 10 using the electric linear motors 35 attached to the replaceable feet 39 that are in contact with the ground G, the linear motors 35 are activated to thrust the rods 38 toward the ground G and deflect the ground G and thereby deliver an impulse or acoustic signal into the earth. The plurality of linear electric motors 35 are activated in a manner such that a portion of the motors 35 operate over one band of frequency through a sweep or other pattern of thrusts while one or more other portions operate at other bands of frequencies through sweeps or other pattern of thrusts so that multiple frequencies are delivered simultaneously creating a desired composite signature or signal into the ground G.

In closing, it should be noted that the discussion of any reference is not an admission that it is prior art to the present invention, especially any reference that may have a publication date after the priority date of this application. At the same time, each and every claim below is hereby incorporated into this detailed description or specification as a additional embodiments of the present invention.

Although the systems and processes described herein have been described in detail, it should be understood that various changes, substitutions, and alterations can be made without departing from the spirit and scope of the invention as defined by the following claims. Those skilled in the art may be able to study the preferred embodiments and identify other ways to practice the invention that are not exactly as described herein. It is the intent of the inventors that variations and equivalents of the invention are within the scope of the claims while the description, abstract and drawings are not to be used to limit the scope of the invention. The invention is specifically intended to be as broad as the claims below and their equivalents.

The invention claimed is:

1. A process for delivering a distinctive seismic signal or signature from a seismic source for a seismic prospecting operation, the process comprising:
    a) providing an electrically powered seismic source having about 100 to 5,000 linear electric motors carried by a frame, wherein a ground contact element of each linear electric motor is provided in contact with the ground; and
    b) driving the ground contact elements of the linear electric motors such that at least two of the plurality of linear motors are deliberately and concurrently delivering different seismic signals against the ground thereby creating a composition of all of the various signals where composition defines a distinctive composite signature of seismic energy conveyed into the earth.

2. The process for delivering acoustic energy into the earth according to claim 1, further including the step of receiving and recording the seismic energy returning to the surface of the earth.

3. The process for delivering acoustic energy into the earth according to claim 1, wherein the linear electric motors are each activated with a different frequency of thrust to form a distinctive composite signature to convey seismic energy into the earth.

4. The process for delivering acoustic energy into the earth according to claim 1, wherein the linear electric motors are activated in groups, each group with a different frequency of thrust to form a distinctive composite signature to convey seismic energy into the earth.

5. The process for delivering acoustic energy into the earth according to claim 1, wherein the linear electric motors are each activated with a different frequency through a sweep or other pattern of thrusts to form a distinctive composite signature to convey seismic energy into the earth.

6. The process for delivering acoustic energy into the earth according to claim 1, wherein the linear electric motors are activated in groups, each group with a different band of frequency through a sweep or other pattern of thrusts to form a distinctive composite signature to convey seismic energy into the earth.

7. The process for delivering acoustic energy into the earth according to claim 1, wherein the impulses are distinctive or distinguishable from other seismic sources due to the distinctive composite signatures.

* * * * *